US005943333A

United States Patent [19]

Whinnett et al.

[11] Patent Number: 5,943,333

[45] Date of Patent: Aug. 24, 1999

[54] RADIO COMMUNICATIONS DEVICE AND METHOD

[75] Inventors: Nicholas William Whinnett, London; William Neil Robinson, Farnham; Jonathan Alastair Gibbs, Southampton; Anthony P Van Den Heuvel, Lightwater, all of United Kingdom

[73] Assignee: Motorola, Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,578

[22] PCT Filed: Jul. 27, 1995

[86] PCT No.: PCT/EP95/03009

§ 371 Date: Jul. 1, 1996

§ 102(e) Date: Jul. 1, 1996

[87] PCT Pub. No.: WO96/05707

PCT Pub. Date: Feb. 22, 1996

[30] Foreign Application Priority Data

Aug. 6, 1994 [GB] United Kingdom .................. 9415966

[51] Int. Cl.$^{6}$ .................................................... H04B 7/185

[52] U.S. Cl. ......................... 370/345; 370/341; 455/12.1; 455/552; 455/557

[58] Field of Search .................................... 370/313, 314, 370/328, 338, 341, 345, 430, 455; 379/59, 60, 61; 342/36, 37; 455/425, 435, 450, 552, 557, 12.1, 33.1

[56] References Cited

U.S. PATENT DOCUMENTS

| | | | |
|---|---|---|---|
| 5,212,684 | 5/1993 | MacNamee et al. | 370/276 |
| 5,313,489 | 5/1994 | Menich et al. | 370/332 |
| 5,533,099 | 7/1996 | Byrne | 379/58 |
| 5,574,775 | 11/1996 | Miller, II et al. | 379/60 |
| 5,574,968 | 11/1996 | Olds et al. | 455/12.1 |
| 5,577,047 | 11/1996 | Persson et al. | 370/95.3 |
| 5,594,718 | 1/1997 | Weaver, Jr. et al. | 370/331 |
| 5,594,781 | 1/1997 | Kozdon et al. | 379/60 |
| 5,603,081 | 2/1997 | Raith et al. | 455/33.1 |
| 5,798,726 | 8/1998 | Schuchman et al. | 342/37 |

FOREIGN PATENT DOCUMENTS

| | | | |
|---|---|---|---|
| 0 577322A1 | 6/1993 | European Pat. Off. . | |
| 0577322 | 1/1994 | European Pat. Off. | H04Q 7/04 |
| WO93/16549 | 8/1993 | WIPO . | |

OTHER PUBLICATIONS

"Towards a Combined GSM 900 DCS 1800 System", Ph.Duplessis, P.Simmons, Matra Communication, Rue JP Timbaud, 78392 Bois d'Arcy France, Fifth Nordic Seminar on Digital Mobile Radio communications, Helsinki Finland Dec. 1–3, 1992,pp. 89–92.

"Developing Technologies For Personal Communication Networks", by P.S. Gaskell, Electronics & Communication Engineering Journal, Apr. 1992, pp. 53–63.

*Primary Examiner*—Douglas W. Olms
*Assistant Examiner*—Shick Hom
*Attorney, Agent, or Firm*—James A. Coffing; Susan L. Lukasik

[57] ABSTRACT

A radio communications device is arranged to communicate time divided signals (60 and 70) over first (40) and second (50) time discontinuous systems having first and second frame structures respectively. Switching device (120) switches between communicating signals (60) over the first system (40) during time periods of the first frame structure and communicating signals (70) over the second system (50) during time periods of the second frame structure. Hence over a given period of time the device simultaneously communicates time divided signals over the first (40) and second (50) systems.

4 Claims, 3 Drawing Sheets

CALL IN PROGRESS ON NETWORK 1 — 200
AWARE OF NEW NETWORKS ? — 210 (NO / YES)
LOOK-UP QUALITY MEASURES FOR HANDOFF FROM NETWORK 1 TO NEW NETWORK — 220
SELECT OPTIMAL NETWORK — 230
IS NETWORK 1 OPTIMAL NETWORK ? — 240 (YES / NO)
DELETE OPTIMAL NETWORK FROM CANDIDATE LIST — 280
LOOK-UP CONTENTION RESOLUTION METHOD FOR HANDOFF FROM NETWORK 1 TO OPTIMAL NETWORK — 250
ATTEMPT TO REGISTER ON OPTIMAL NETWORK (WITH CONTENTION RESOLUTION) — 260
REGISTRATION SUCCESSFUL ? — 270 (NO / YES)
INITIATE LINK SETUP ON OPTIMAL NETWORK (WITH CONTENTION RESOLUTION) — 290
SIMULTANEOUS OPERATION ON BOTH NETWORKS (WITH CONTENTION RESOLUTION) — 300
CALL ROUTED TO OPTIMAL NETWORK ? — 310 (NO / YES)
DROP LINK FROM NETWORK 1 — 320
CALL IN PROGRESS ON OPTIMAL NETWORK — 330

10
20
30
PSTN OR ISDN
40
50
NETWORK 1
REGISTRATION
45
NETWORK 2
REGISTRATION
55
60
70
100
TX/RX
110
TERMINAL
MULTIMODE
120
130
MODE 1
MODE 2
140
150
CONTROL
160
MEMORY

RADIO COMMUNICATIONS DEVICE AND METHOD

FIELD OF THE INVENTION

This invention relates to a radio communications device and particularly but not exclusively to handoff between two dissimilar systems to which the device is communicating.

BACKGROUND OF THE INVENTION

Various digital communication networks exist worldwide and provide various services for registered user devices. In many areas different networks overlap and service to more than one network is possible.

Multi-mode devices have been proposed which are able select and register with one from a number of networks, depending on the availability of the networks in question.

A problem with this arrangement is that a multi-mode device having a single transmitter/receiver would not be able co-establish and co-register on two networks simultaneously without losing data. Therefore an already established call on one network must be terminated before the device can switch to the other network, i.e. the call must be relinquished.

It would be possible to build a device with two receivers, so as to monitor and receive from two networks simultaneously, thus preserving an established call and switching it from one network to another. However, a device with two receivers would be expensive and significantly larger in size than a single receiver terminal. Similarly it would be possible to provide two transmitters for maintaining a call on one network and establishing a call on the second network during a handover period before dropping the call on the first network. This too would be expensive.

This invention seeks to provide a radio communications device and method in which the above mentioned disadvantages are mitigated.

SUMMARY OF THE INVENTION

According to a first aspect of the present invention a radio communications device is provided, arranged to communicate time divided signals over first and second time discontinuous systems having first and second frame structures respectively, comprising: switching means for switching between communicating signals over the first system during time periods of the first frame structure and communicating signals over the second system during time periods of the second frame structure, such that over a given period of time the device simultaneously communicates time divided signals over the first and second systems.

Preferably the device further comprises control means for causing the switching means to switch between communicating signals according to a contention scheme, wherein the contention scheme manages the activities of the device during simultaneous communication such that any contention between the communicating signals over the first and second systems is resolved.

The contention scheme preferably manages the switching means such that contention is resolved between transmission communication signals and reception communication signals when the device is not capable of transmitting and receiving simultaneously.

Preferably the device is arranged to receive first and second time divided signals from the first and second systems, such that over a given period of time the device simultaneously receives time divided signals from the first and second systems.

The device is preferably arranged to transmit first and second time divided signals to the first and second systems, such that over a given period of time the device simultaneously transmits time divided signals to the first and second systems.

Preferably the management of the communication includes substantially reducing and eliminating any data loss.

According to a second aspect of the invention a method of handoff from a first time discontinuous system to a second time discontinuous system by a radio communications device is provided, comprising the steps of, establishing a call with a remote user via the first time discontinuous system; establishing communication with the second time discontinuous system while continuing the call via the first time discontinuous system according to a contention scheme, handing off from the first to the second time discontinuous system whilst maintaining the call to the remote user via the second time discontinuous system, wherein the contention scheme manages the communications activities of the device during simultaneous communication such that contention between the communication of the first and the second time discontinuous systems is substantially resolved and the call is maintained. Preferably the management of the communication includes substantially reducing and eliminating any data loss.

Preferably the contention scheme is based on known characteristics of the time discontinuous systems, such that sufficient data is received by the terminal to maintain communication with the time discontinuous systems.

If only the first time discontinuous system has signal coding and interleaving, preferably the contention scheme is arranged to suspend communicating signals over the first system in favour of the second system when a contention occurs.

If the first and the second time discontinuous systems are similar, preferably the contention scheme is arranged to alternately suspend communicating signals from each of the first and the second systems. Preferably the time discontinuous systems include DECT and/or GSM systems.

In this way a terminal (radio receiver) having a single receiver and having an established call on one network may handover to another network substantially without losing data and possibly thereby relinquishing the call. The invention applies to time discontinuous CDMA communications as it applies to TDMA communications and the expression TDMA is intended to apply to time discontinuous CDMA.

BRIEF DESCRIPTION OF THE DRAWINGS

An exemplary embodiment of the invention will now be described with reference to the drawings in which.

DETAILED DESCRIPTION OF A PREFERRED EMBODIMENT

Figure 1:
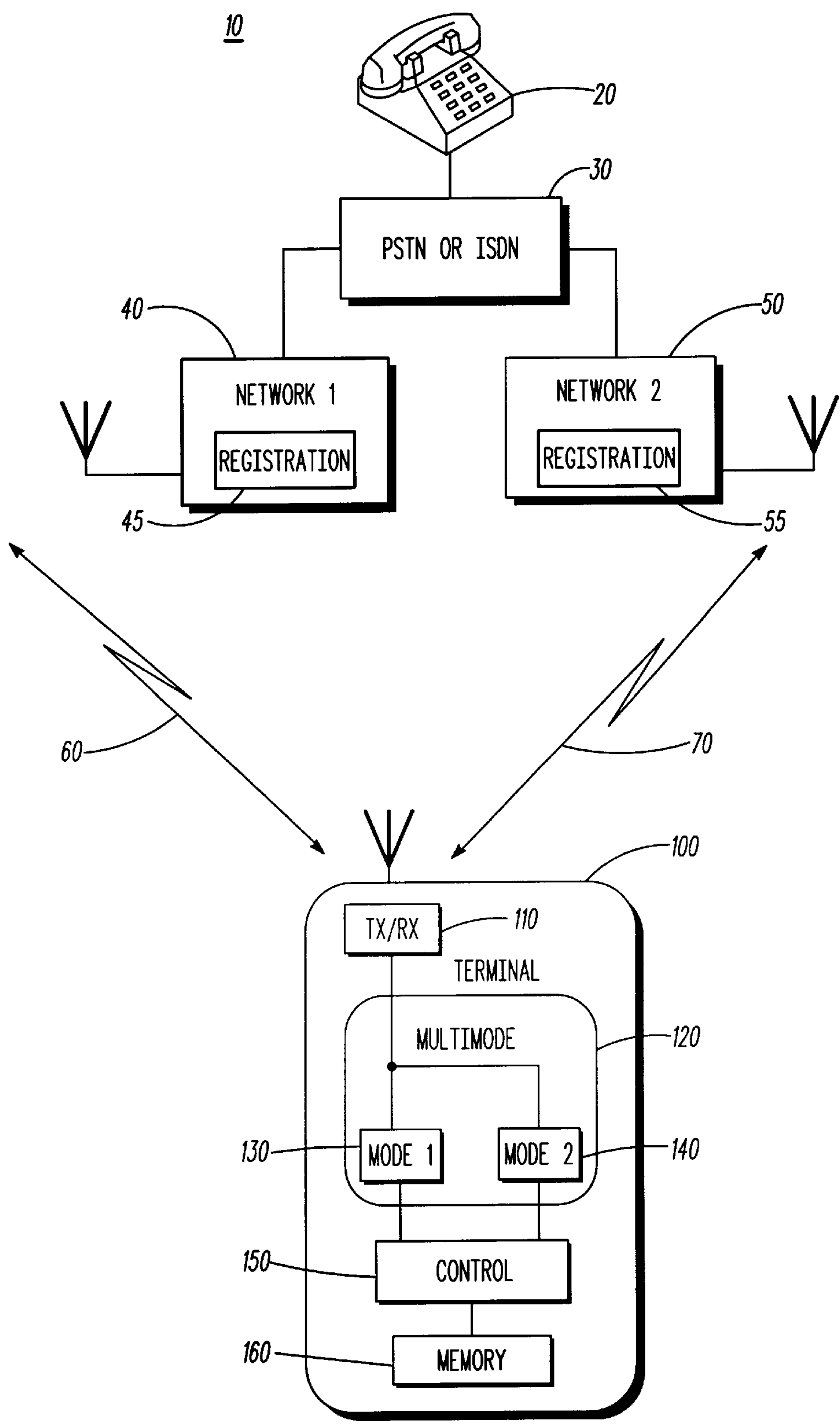
FIG. 1 shows a functional block diagram of a communications system including a preferred embodiment of a radio receiver in accordance with the invention.

Referring to FIG. 1, there is shown a communications system 10. A telephone 20 of the system 10 is connected to a conventional public switched telephone network (PSTN) 30. Alternatively, the telephone network 30 could be an Integrated Services Digital Network (ISDN).

A first network 40 is coupled to the PSTN 30 and provides a first TDMA air-interface 60 between the PSTN 30 and any terminal device registered with the first network 40. The first network 40 contains a registration block 45, to be further explained hereafter.

In a similar way, a second network 50 is also coupled to the PSTN 30 and provides a second TDMA air-interface 70 between the PSTN 30 and any terminal device registered with the second network 50. The second network 50 similarly contains a registration block 55, to be further explained hereafter.

The first and second TDMA air-interfaces are arranged as TDMA channels. Each TDMA carrier is divided into time frames. Each frame is further subdivided into time slots. A particular communication is assigned one or more slots per frame.

A terminal 100 of the system 10 has a transceiver 110, for providing communication with the system 10 in a manner to be further described below. A multi-mode block 120 of the terminal 100 contains a first mode block 130 and a second mode block 140, each selectively coupled to the transceiver 110.

A controller 150, typically a microcontroller, is coupled to control the first and second mode blocks 130 and 140, and their selective coupling to the transceiver. In this way the first mode block 130, if selected by the controller, provides a first mode of operation of the terminal such that communication takes place with the first network 40 over the first TDMA air-interface 60. Similarly, the second mode block 140, if selected by the controller, provides a second mode of operation of the terminal such that communication takes place with the second network 50 over the second TDMA air-interface 70. In this way the controller 150 switches between the air-interfaces 60 and 70. A memory 160 is coupled to the controller 150, for storing data to be further described below.

Figure 2:
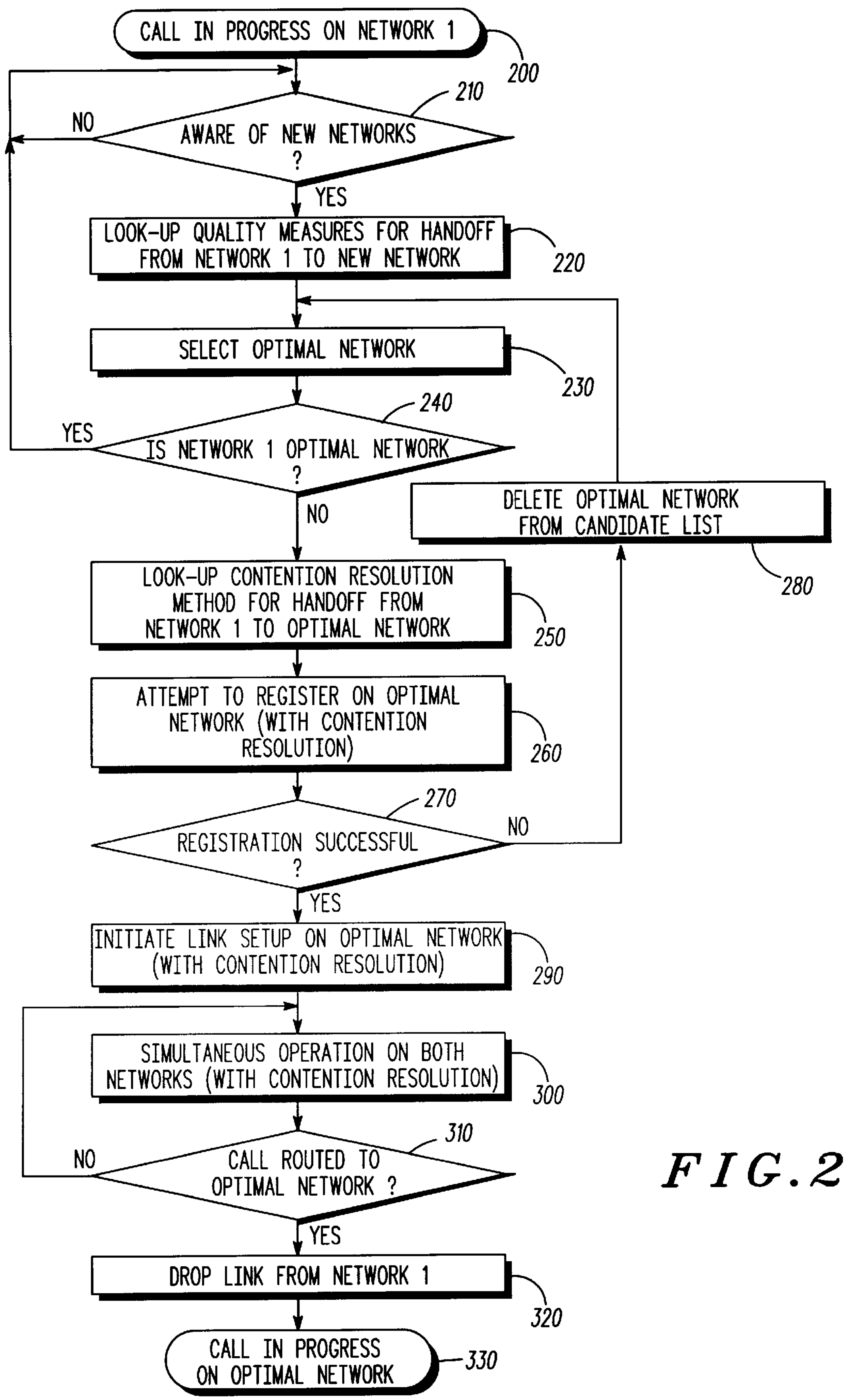
FIG.2 shows a flow chart of operation of the radio receiver of FIG. 1.

In operation, and with reference also to FIG. 2, the terminal 100 is initially registered with the first network 40. This may typically be because at the time registration was made, only the first network 40 was visible to the terminal 100. A call made between the telephone 20 and the terminal 100 is achieved via the PSTN 30 and the first network 40 (block 200). In this case, the first mode block 130, controlled by the controller 150, provides the first mode of operation of the terminal 100 in order to achieve communication over the first TDMA air-interface 60.

During the call, the second network 50, which is not currently registered with the terminal 100, may become available to the terminal. This may occur in a number of ways. The terminal 100 may move into a particular cell of the first network 40, and the memory 160 may contain data about that particular cell, to the effect that if in this cell the second network 50 may also be available. The controller 150 will then use gaps between sampled transmissions on the first TDMA air-interface 60 (i.e. when the transceiver 110 is idle) to confirm or otherwise the presence of the second network 50.

Alternatively the controller 150 may use gaps between sampled transmissions on the first TDMA air-interface 60 (i.e. when the transceiver 110 is idle) to search periodically for the second network 50 via the second mode block 140 over the second TDMA air-interface 70.

In either case if no transmission is heard from the second network 50, then the call continues via the first network 40 over the first air interface 60. The attempted detection (block 210) is repeated at regular intervals during the call.

In both ways the terminal 100 is capable of becoming aware that registration to the second network 50 is possible (block 210). Once the terminal 100 is aware of the availability of the second network 50, it must then decide which network offers the optimal service, based on the following information.

The memory 160 contains, in data form, information about the two networks, such as cost, features available, handover capability and quality. This data may be received from the two networks 40 and 50 or programmed directly to the memory during manufacture or service. Furthermore, the memory 160 contains contention resolution data, to be further described below. Additionally, the memory 160 may also contain data indicating a user preference, should there be one. The controller 150 uses the network information data together with the user preference data to select the optimal network, namely that which offers the optimal service (block 230).

The controller 150 then decides whether the optimal network is the currently registered one, in this case the first network 40 (block 240). If this is the case, then the call and the terminal registration is maintained on the first network 40.

If the optimal network is not the currently registered one, (i.e. the optimal network is the second network 50), then the terminal 100 will seek to handoff to the second network 50. However, the terminal 100 must register with the second network 50 before handoff from the first network 40 can take place. In order that the call is not lost, the terminal 100 must be able to substantially communicate with the two networks in parallel, until a communication link has been established between the terminal 100 and the telephone 20 via the second network 50.

The controller 150 looks up a contention resolution scheme suitable for the first and second networks 40 and 50, from the contention resolution data in the memory 160 (block 250). The contention resolution data may be programmed during manufacture or received from the networks, and contains a contention resolution scheme for every combination of two networks in order to reduce and where possible eliminate any data loss during simultaneous communication between the two networks.

Figure 3:
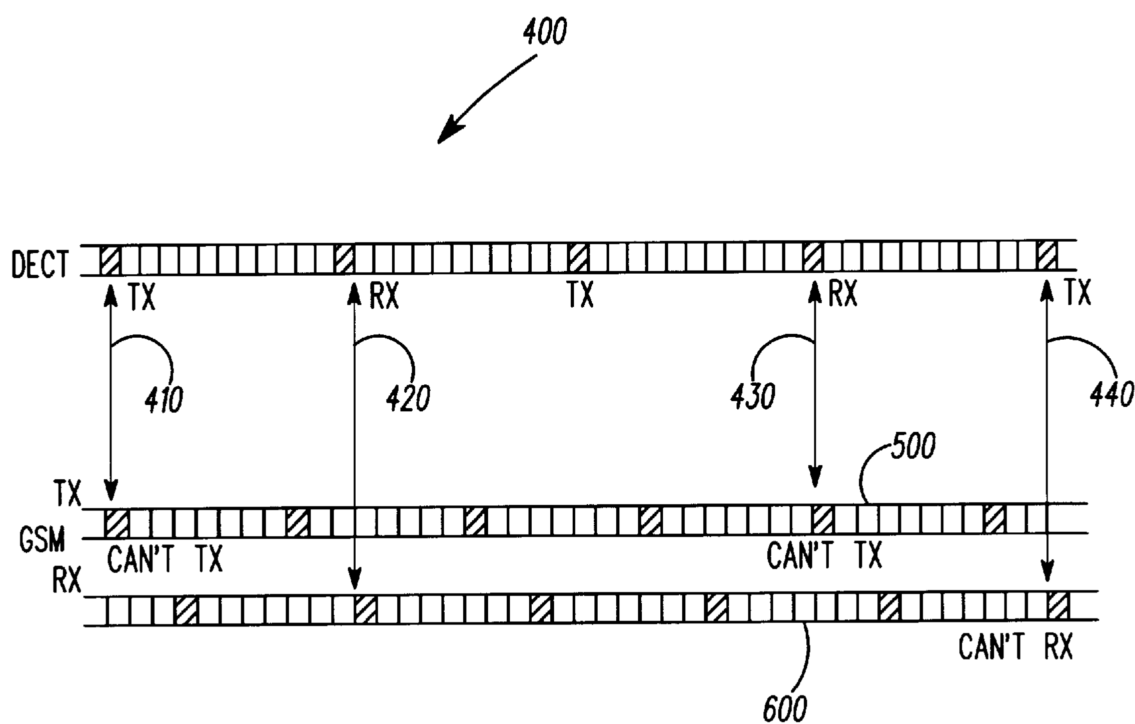
FIG.3 shows a diagram of operation of the radio receiver of FIG. 1.

For example, and also referring to FIG. 3, the first network 40 is a DECT network, having a single TDMA frequency 400 divided into transmit and receive slots and the second network 50 is a GSM network having a TDMA transmit frequency 500 divided into transmit slots and a TDMA receive frequency 600 divided into receive slots.

During simultaneous communication between the two networks, a contention between slots occurs at the times indicated by arrows 410, 420, 430 and 440. At arrow 410 transmission is required on frequencies 400 and 500 simultaneously. In a similar way at arrow 420 reception is required on frequencies 400 and 600 simultaneously. At arrows 430 and 440, transmission and reception are required simultaneously. At all other times simultaneous communication can take place successfully because there is no contention between slots, and the controller 150 switches between the frequencies 400, 500 and 600 accordingly.

The contention resolution scheme for DECT/GSM takes account of the fact that the GSM network has coding and interleaving, whereas the DECT network does not. Therefore, if at any one time, such as indicated by the arrows 410, 420, 430 and 440 the terminal 100 is being asked to communicate with both networks, the contention resolution scheme will call for the GSM slot (or part of the GSM slot) to be dropped, because the data carried in the GSM slot is coded and interleaved. Hence it may be recoverable from earlier and/or later transmissions, whereas this is not possible for the data carried in the DECT slot. Therefore taking the case of the arrow 420, the contention scheme will cause the controller 150 to set the transceiver 110 to receive on frequency 400 during this time, and not frequency 600. The contention scheme also takes into account the presence or otherwise of a duplexer which determines if the terminal is capable of transmitting and receiving simultaneously. With a duplexer, the contentions indicated by the arrows 430 and 440 (transmit and receive simultaneously) are overcome, so there is no need to drop either of the slots in these cases.

A contention resolution scheme for two networks which both have coding and interleaving will take account of the number of slots per frame of the TDMA networks, wherein the network with the higher number is dropped if contention occurs, hence preserving a higher proportion of data on the dropped system. Alternatively in this case, for a particular technology combination, the contention resolution scheme may call for the data loss to be shared between both networks. This may be done by means of a simple alternate dropping strategy per contention event, or by means of a more sophisticated approach which may take in to account for example the maximum tolerable data loss occurring per interleaving block of each system.

The contention resolution scheme may also take account of the nature of the data being communicated to and from each network. For example, signalling data may have priority over traffic data. Another example would be where the same user information is being transmitted from each network, in which case the terminal may for a time choose to only receive from a single network. A situation where the second example may occur would be where a seamless handover takes place by setting up a multiparty call and then dropping one of the parties. While in the multiparty call state, the terminal need only receive from one of the networks.

The contention resolution scheme taken from the contention resolution data in the memory 160 is hence used by the controller 150 to manage the activities of the transceiver 110 during simultaneous communication such that effective contention resolution is achieved and communication is maintained to each network.

The terminal 100 then attempts to register with the second network 50 (block 260), whilst maintaining the call through the first network 40, the controller 150 using the contention resolution described above.

If registration with the second network 50 is not successful, then communication thereto is terminated and the second network 50 ceases to be the optimal network (block 280). The controller 150 then selects another optimal network from the known networks available (block 230) and repeats the above steps.

If registration with the second network 50 is successful then the controller 150 initiates a call via the second mode block 140 and the transceiver 110 over the second TDMA air-interface 70 to the second network 50 (block 290).

Alternatively, for some implementations of inter-system handover the second mode block may receive a call from network 50 over the second TDMA air-interface 70. Simultaneous communication, with contention resolution continues during this time (blocks 300 and 310) until the call via the second network 50 is achieved. At this point, the call is switched over from the first network 40 to the second network 50 and the terminal 100 drops communication and registration with the first network 40 (block 320).

The call continues to the telephone 20 via the PTSN 30, the second network 50, the second TDMA air-interface and the second mode block 140 of the terminal 100.

It will be appreciated by a person skilled in the art that alternative embodiments to the one described above are possible. For example, the contention resolution data and the data about each network which is stored in the memory 160 could be received from each network through the transceiver 110.

The principles described above apply equally to handoff in CDMA systems.

Direct Sequence CDMA has an inherent disadvantage compared to TDMA when it comes to handoff in that generally, CDMA transmissions are continuous in time. This makes inter-system monitoring, registration and call establishment difficult without multiple transmitters/receivers. In the RACE CODIT research programme, a time discontinuous mode is entered into to facilitate inter-frequency CDMA handoff. A similar process could be envisaged for CDMA/TDMA handoff in future CDMA systems with the mobile controlling the parameters of the discontinuous mode. Steve: this area is probably going to be the subject of another disclosure in the near future.

Time discontinuity also occurs in the following instances for the Qualcomm CDMA system. In a reduced information rate mode (e.g. during speech inactivity), the uplink is time discontinuous, with gaps occurring for the order of 1.25 ms (or multiple thereof), which makes switching to perform random access and signalling on the TDMA system possible in principle if the free period and the TDMA time slot coincide.

It will also be appreciated by a person skilled in the art that the networks and terminal 110 could be so arranged that when a contention is about to occur, the terminal 100 prompts one of the networks to handover to a non-contentious slot, thereby eliminating the contention. This is particularly applicable in the case where the TDMA frame times are harmonically related.

Furthermore the contention resolution scheme may be used to obtain multiple simultaneous services from the two networks 40 and 50, such as voice and data services.

Generalisations can be readily made to the cases where a terminal may have more than two modes; where there may be one or more networks available on each mode; and hence where there may be more than two networks to choose between.

We claim:

1. A method of handoff from a first time discontinuous system to a second time discontinuous system by a radio communications device comprising the steps of, establishing a call with a remote user via the first time discontinuous system; establishing communication with the second time discontinuous system while continuing the call via the first time discontinuous system during a handoff period;

invoking a contention scheme to determine which of the first and second time discontinuous systems is in communication with the remote user during the handoff period; and handing off from the first to the second time discontinuous system whilst maintaining the call to the remote user via the second time discontinuous system, wherein the contention scheme manages the communications activities of the device during the handoff period such that contention between the communication of the first and the second time discontinuous systems is substantially resolved and the call is maintained.

2. The method of claim 1, wherein the contention scheme is based on known characteristics of the time discontinuous systems.

3. The method of claim 1, wherein if only the first time discontinuous system has signal coding and interleaving, the contention scheme is arranged to suspend communicating signals over the first system in favor of the second system when a contention occurs.

4. The method of claim 1, wherein if the first and the second time discontinuous systems are similar, the contention scheme is arranged to alternately suspend communicating signals from each of the first and the second systems.

* * * * *